United States Patent
Kesal et al.

(10) Patent No.: US 7,844,073 B2
(45) Date of Patent: Nov. 30, 2010

(54) WATERMARK-BASED GOODS AUTHENTICATION

(75) Inventors: Mustafa Kesal, Urbana, IL (US); Mehmet Kivanc Mihcak, Redwood, WA (US); Ramarathnam Venkatesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 648 days.

(21) Appl. No.: 11/850,414

(22) Filed: Sep. 5, 2007

(65) Prior Publication Data

US 2007/0300071 A1    Dec. 27, 2007

Related U.S. Application Data

(63) Continuation of application No. 10/716,993, filed on Nov. 19, 2003, now Pat. No. 7,302,079, which is a continuation of application No. 10/641,684, filed on Aug. 14, 2003, now Pat. No. 7,257,234.

(51) Int. Cl.
*H04K 1/00* (2006.01)

(52) U.S. Cl. .......................................... 382/100; 380/55

(58) Field of Classification Search ................. 382/100, 382/232; 713/176; 358/3.28; 380/210, 287, 380/54, 55
See application file for complete search history.

(56) References Cited

U.S. PATENT DOCUMENTS

| | | | |
|---|---|---|---|
| 3,406,344 A | 10/1968 | Hopper | 325/50 |
| 4,203,166 A | 5/1980 | Ehrsam et al. | 375/2 |
| 4,866,770 A | 9/1989 | Seth-Smith et al. | 380/20 |
| 5,790,703 A | 8/1998 | Wang | 382/212 |
| 5,995,638 A | 11/1999 | Amidror et al. | 382/100 |
| 6,094,722 A | 7/2000 | Astola et al. | 713/176 |
| 6,373,974 B2 | 4/2002 | Zeng | 382/135 |
| 6,834,344 B1* | 12/2004 | Aggarwal et al. | 713/176 |
| 7,039,189 B1* | 5/2006 | Kienzle et al. | 380/239 |
| 2003/0016841 A1* | 1/2003 | Reed et al. | 382/100 |
| 2003/0188150 A1 | 10/2003 | Ohkado et al. | 713/150 |

OTHER PUBLICATIONS

Chang et al., "Geometric Properties of Watermarking Schemes," Proc. IEEE Int. Conf. on Image Processing, Sept. 2000, vol. III, pp. 714-717.*

Busch, et al., "Sensitivity Labels and Invisible Indentification Markings in Human-Readable Output", SPIE, vol. 4675, 2002, pp. 149-157.

Wang, et al., "Embedding Digital Watermarks in Halftone Screens", SPIE, vol. 3971, 2000, pp. 218-228.

Yeung, et al., "An Invisible Watermarking Technique For Image Verification", IEEE, vol. 2, 1997, pp. 680-684.

* cited by examiner

*Primary Examiner*—Andrew W Johns
(74) *Attorney, Agent, or Firm*—Lee & Hayes, PLLC

(57) ABSTRACT

An implementation is described herein facilitates certification of goods and/or identifications of the source of such goods. At least one implementation, described herein, embeds a watermark into a relatively small amount of data in a deterministic manner. This abstract itself is not intended to limit the scope of this patent. The scope of the present invention is pointed out in the appending claims.

10 Claims, 11 Drawing Sheets

WATERMARK-BASED GOODS AUTHENTICATION

RELATED APPLICATIONS

This is a continuation of U.S. patent application Ser. No. 10/716,993, filed Nov. 19, 2003, which is a continuation of U.S. patent application Ser. No. 10/641,684 filed Aug. 14, 2003. This application claims the benefit of U.S. patent application Ser. No. 10/641,684 and the filing date of Aug. 14, 2003.

BACKGROUND

Herein, "goods" is a generic label for content which is represented on/by a physical medium or on/by an electronic medium. Examples of physical medium representation include printed image and printed document or other data. Examples of electronic medium representation include electronically stored or transmitted images, audio clips, video, multimedia, software, and data.

There are many conventional approaches designed to aid in goods authentication and/or deter counterfeiting. Sophisticated document production is the most common approach.

Counterfeits

For as long as important documents (which are examples of "goods") have existed, ne'er-do-wells have forged them when they could not acquire, would not acquire, or could not afford to acquire the real thing.

Counterfeit money was often the product of their forgery. To combat and deter such counterfeiting (of money or other important documents), issuing organizations have produced documents with increasingly more sophistication.

Sophisticated Production

The test of the veracity of important documents has been the difficulty of producing such documents. Often important documents have counterfeit-deterrence features. For example, the receiver of legal tender assumes that it is authentic because of the great difficulty and sophistication required to produce a passable counterfeit.

However, recent advances in printing technology have made high-quality printing devices relatively inexpensive. Furthermore, recent advances in imaging technology have made high-quality image manipulation software relatively inexpensive and readily accessible.

The availability of high-end printers and advanced imaging software has rendered forging most goods (such as important documents) a relatively simple task. In response, issuing organizations (such as governments) have implemented increasingly more sophisticated and presumptively more expensive production techniques. Examples of such sophisticated production techniques include employing one or more of the following in the final goods: holograms, watermarks, micro-printing, special print paper, security threads, magnetic properties, and chemical flags.

Watermarks

Historically, a traditional watermark is a faintly visible mark imprinted on or embedded in print media (such as stationary) that typically identifies the source of the print medium. Watermarks have been around almost as long as print media (such as paper) as existed. Like hallmarks on silver, watermarks were originally used to show which artisan had produced which paper. They later became synonymous with security, appearing on banknotes to deter counterfeiters. Herein, this type of watermark is called a "traditional watermark."

Like a traditional watermark, a "digital watermark" is an embedded identifying mark, but it is embedded into digital goods. It typically contains hidden identification data and is often used to track the use of copyrighted materials.

Unlike traditional watermarks, which are intended to be somewhat visible, digital watermarks are typically designed to be completely imperceptible to the human senses. If it is an image, then the digital watermark is typically invisible to the naked eye. If it an audio clip, then the digital watermark is typically inaudible to the human ear. While it is imperceptible to humans, digital watermarks are typically at least detectable by a specifically designed digital watermark detector.

Those of ordinary skill in the art are familiar with conventional techniques and technology associated with watermarks, watermark embedding, and watermark detecting.

SUMMARY

An implementation is described herein facilitates certification of goods and/or identifications of the source of such goods. At least one implementation, described herein, embeds a watermark into a relatively small amount of data in a deterministic manner.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of the present invention, and thereby, to better explain the present invention. Furthermore, for ease of understanding, certain method steps are delineated as separate steps; however, these separately delineated steps should not be construed as necessarily order dependent in their performance.

The following description sets forth one or more exemplary implementations of a Watermark-based Goods Authentication that incorporate elements recited in the appended claims. These implementations are described with specificity in order to meet statutory written description, enablement, and best-mode requirements. However, the description itself is not intended to limit the scope of this patent.

These exemplary implementations, described herein, are examples. These exemplary implementations do not limit the scope of the claimed present invention; rather, the present invention might also be embodied and implemented in other ways, in conjunction with other present or future technologies.

Examples of embodiments of a Watermark-based Goods Authentication may be described herein as "exemplary authentication architecture", an "exemplary deterministic watermarking", an "exemplary authentication mark authenticator," and/or "exemplary secret key distribution."

Herein, "goods authentication" refers to the confirmation that the presented goods are authentic, genuine, legitimate, valid, and/or unadulterated. This may also be called "goods certification." Herein, "entity identification" refers to the identification of an entity associated with authentic goods. That entity is typically an entity the issues the genuine goods or a user that receives it.

Those skilled in the art realize that, although the implementations, described herein, focus on use with images, the present invention may be advantageously used with any of a wide variety of different types of digital goods (such as images, audio, video, multimedia, software, databases, and other large datasets).

Introduction

Figure 11:
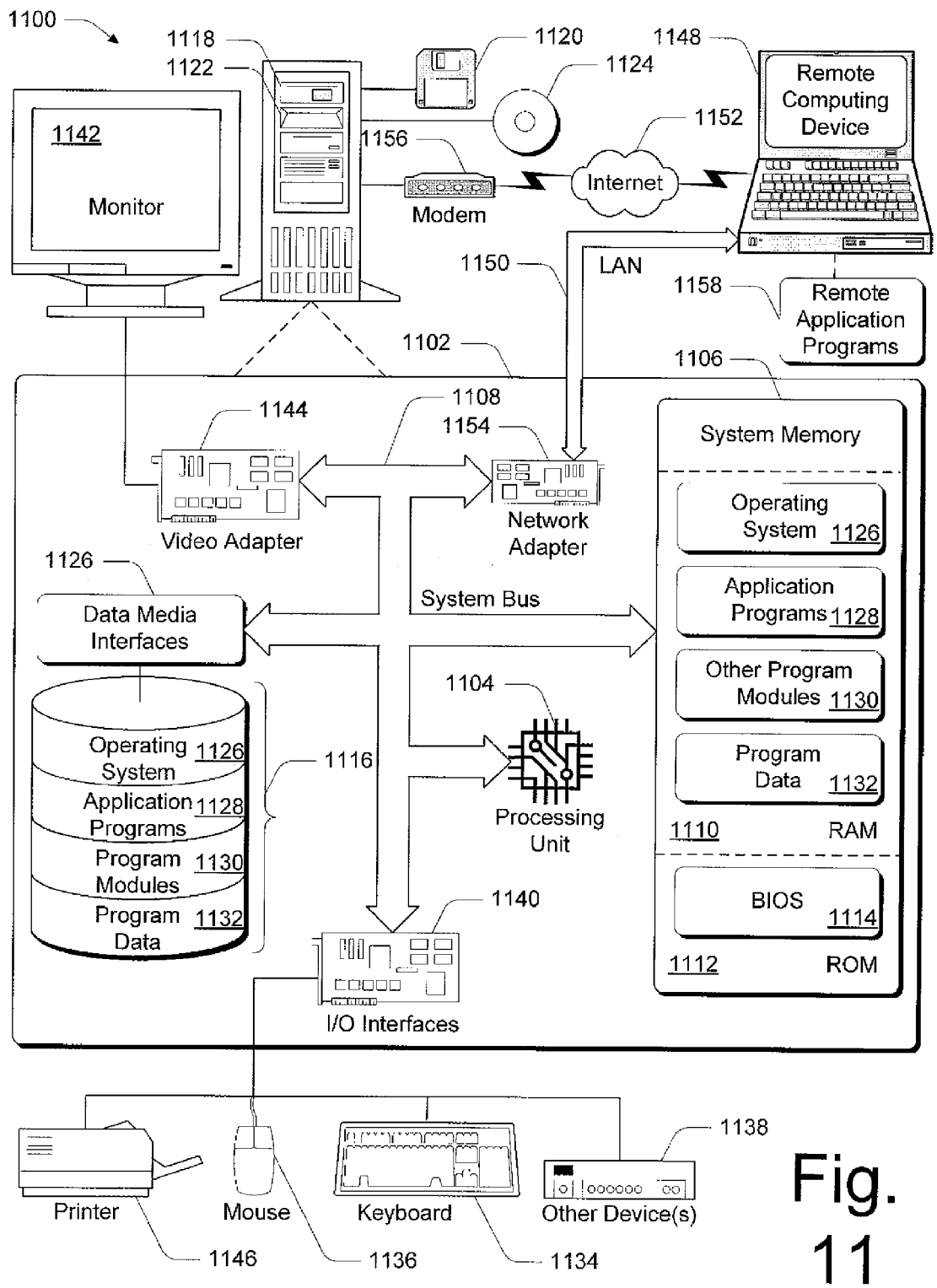
FIG. 11 is an example of a computing operating environment capable of (wholly or partially) implementing at least one embodiment described herein.

The one or more exemplary implementations, described herein, of the present claimed invention may be implemented (in whole or in part) by an authentication architecture, mark embedding system 100, mark authentication system 200, and/or as part of a computing environment like that shown in FIG. 11.

Figure 1:
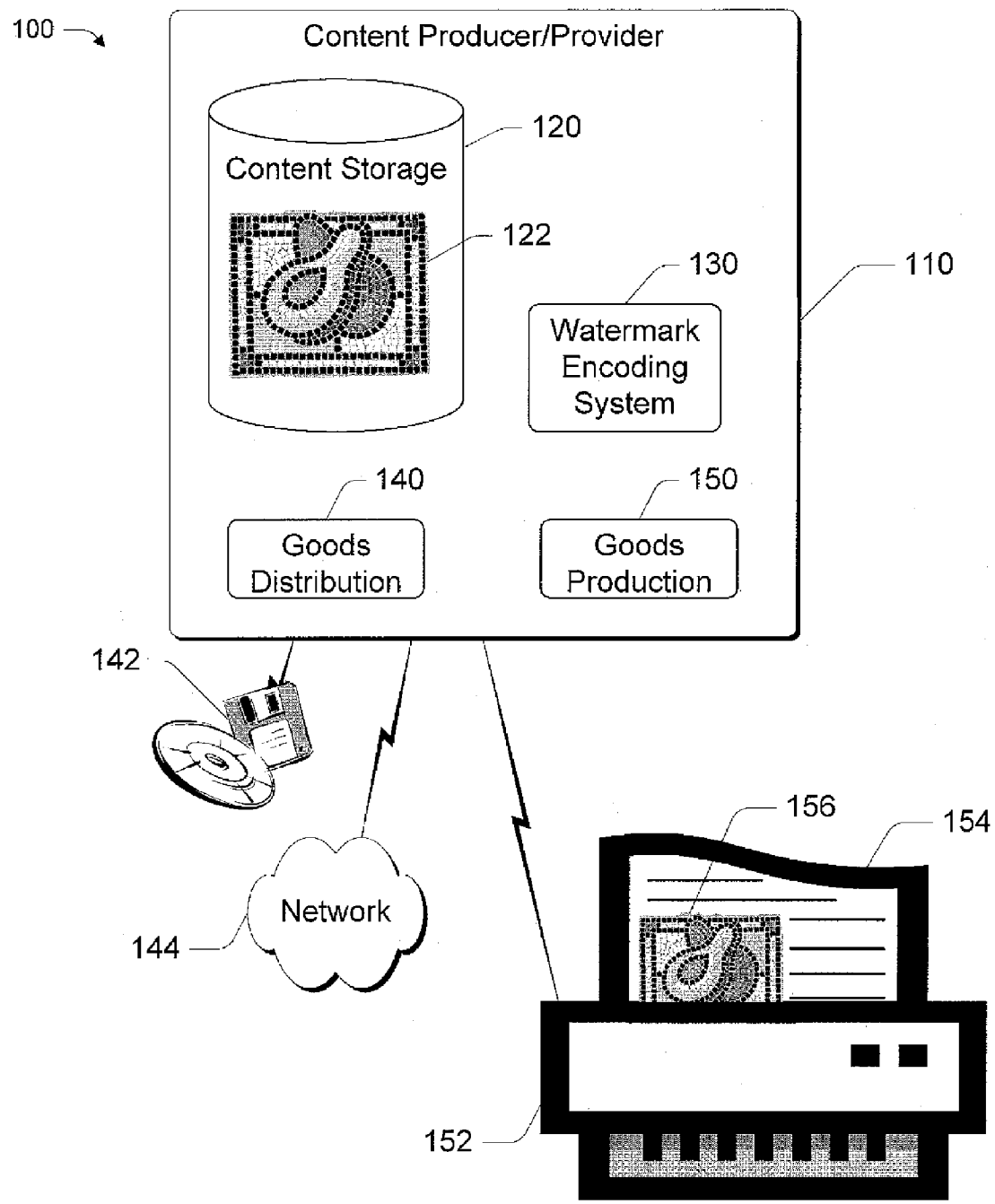
FIG. 1 is schematic diagram illustrating a mark embedding system in accordance with an implementation.
Figure 2:
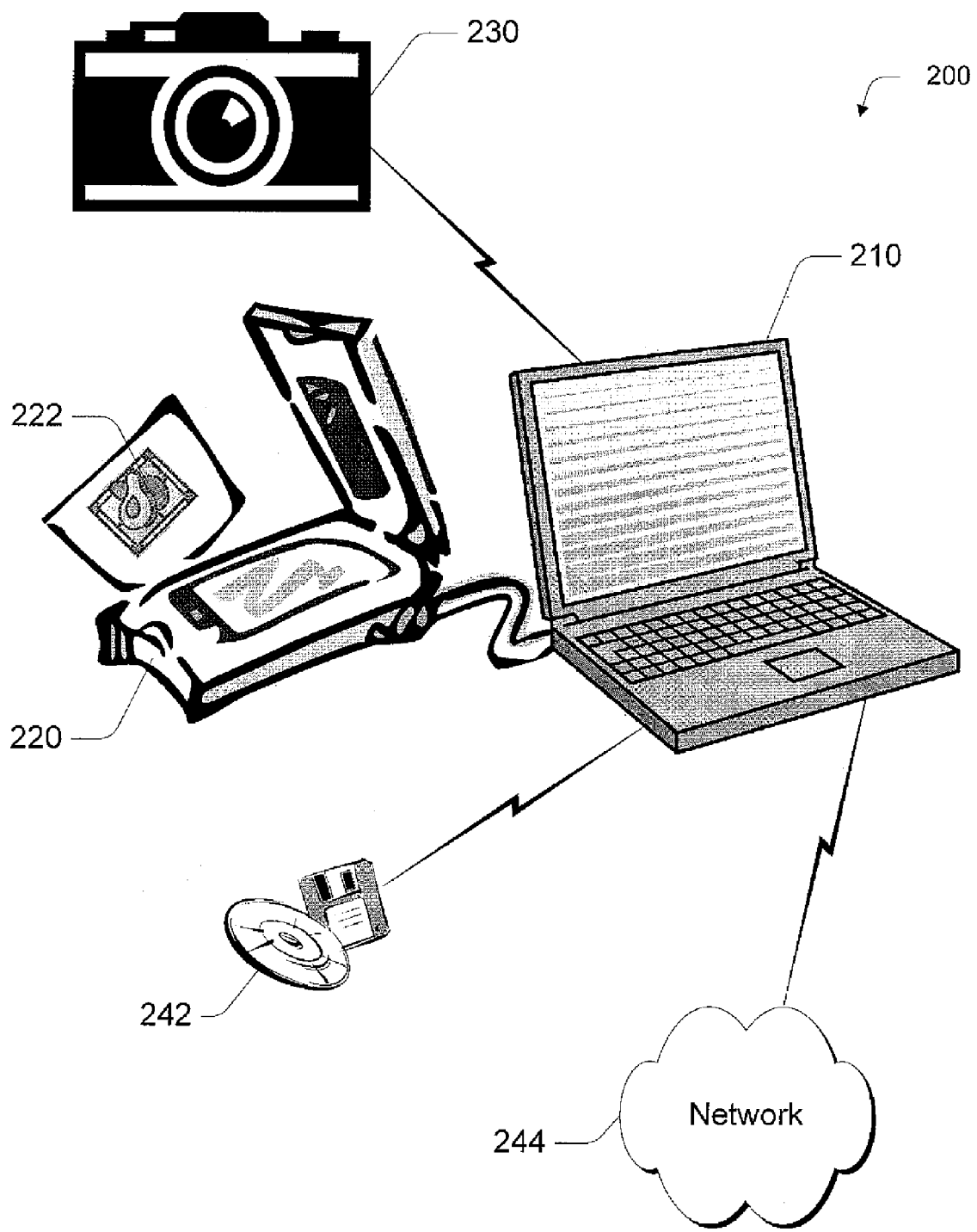
FIG. 2 is schematic diagram illustrating a mark authentication/detection system in accordance with an implementation.

FIGS. 1 and 2 show the authentication architecture. As described herein, it has three implementation aspects:

exemplary deterministic watermarking exemplary authentication mark authenticator; and exemplary secret key distribution.

The authentication architecture includes the mark embedding system 100 for generating the marked goods and mark authentication system 200 for facilitating that the subject (e.g., not counterfeit) and identifying the source entity. Both systems share a common secret key which is used as the seed of a secure pseudo-random number generator and unknown to the adversary. Alternatively, there may be a common master key for generation of one of multiple entity-specific keys.

Deterministic Watermark Embedding/Detecting with Small Host Signal Size

Unlike conventional spread spectrum schemes that require large signal size for convergence, the exemplary deterministic watermarking produces satisfactory results even when the host signal size is small.

Figure 3:
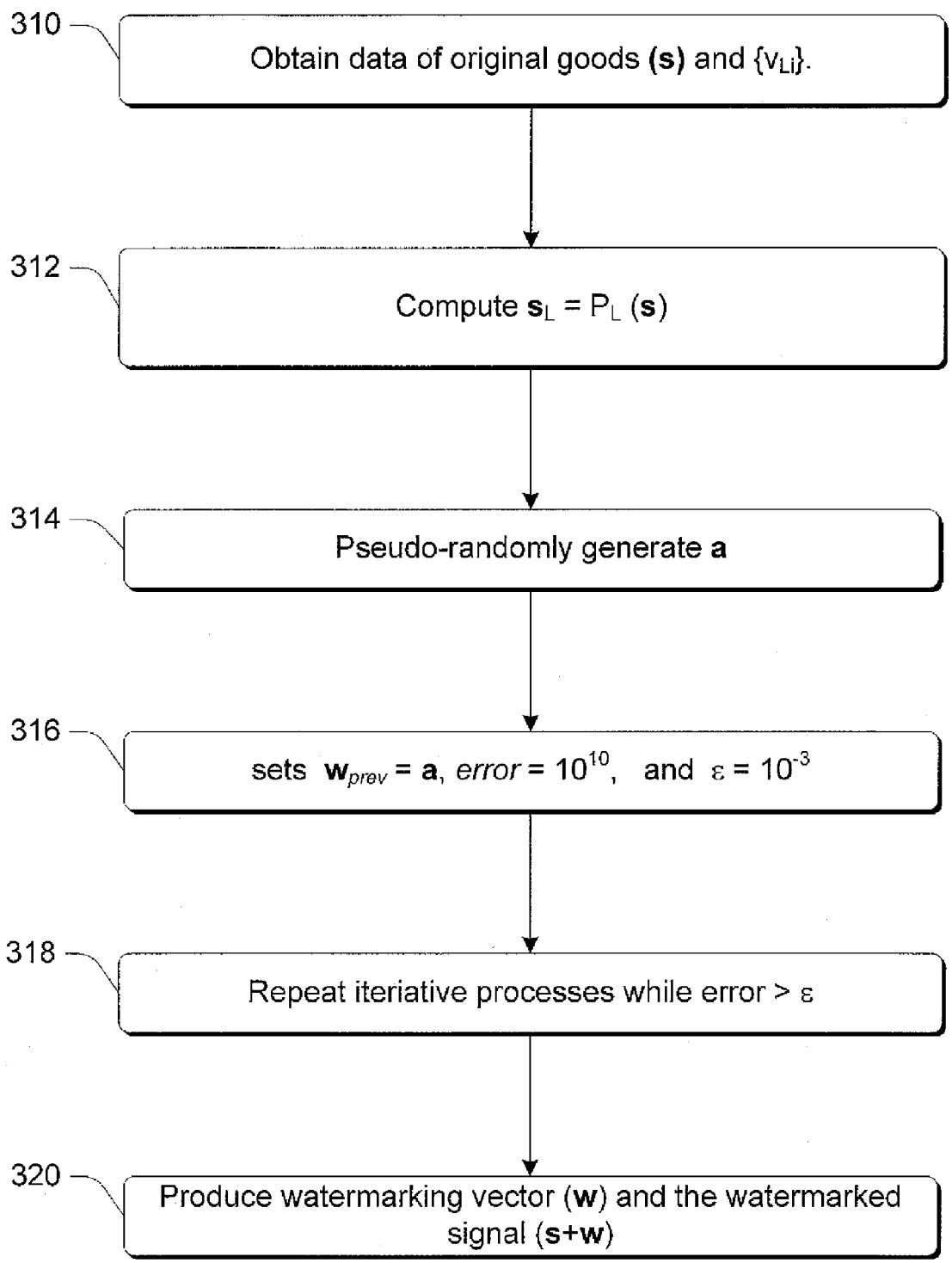
FIG. 3 is a flow diagram showing a methodological implementation described herein.
Figure 4:
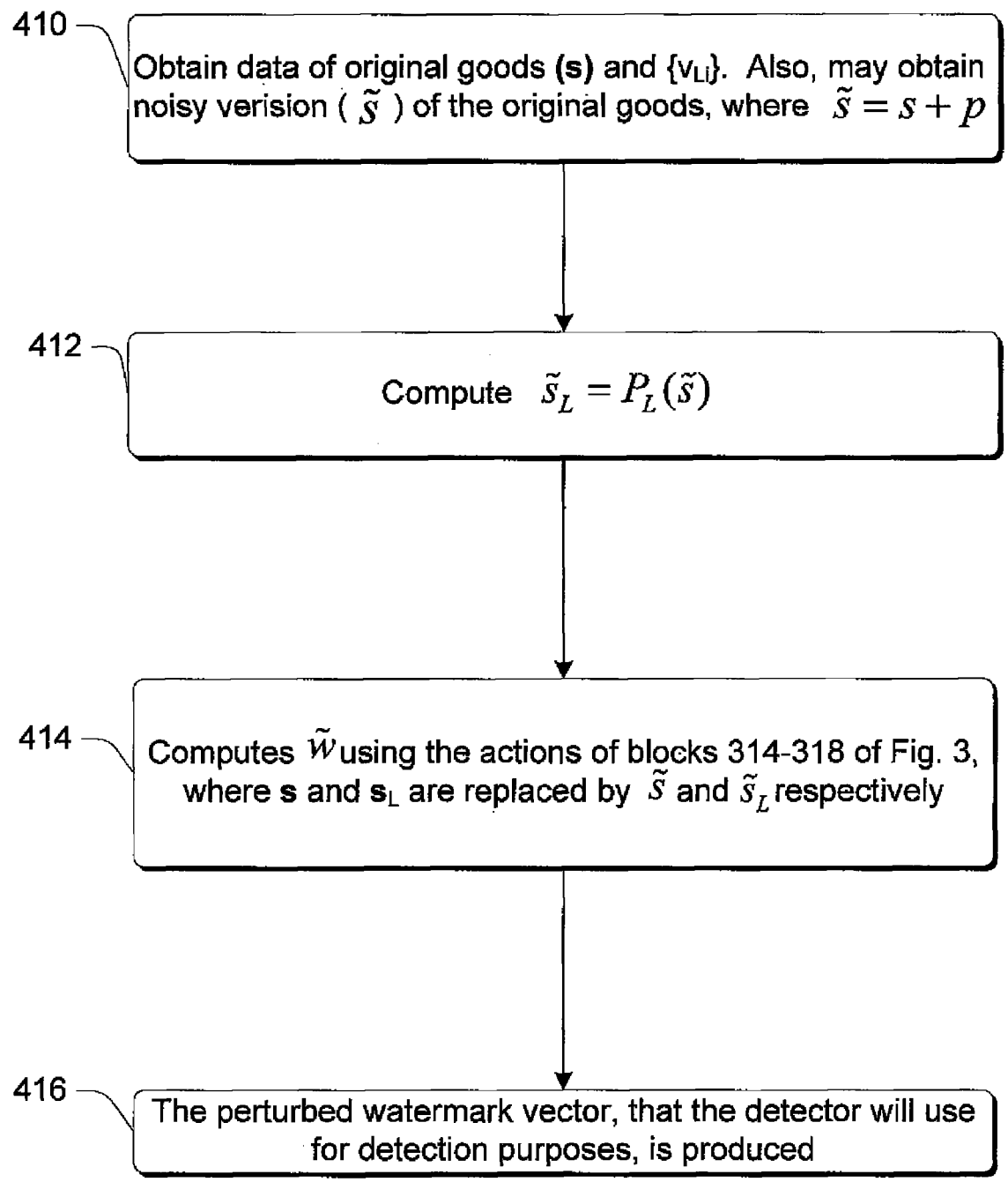
FIG. 4 is a flow diagram showing a methodological implementation described herein.

The operation of the exemplary deterministic watermarking is discussed with regard to FIGS. 3 and 4.

Goods Authentication via Perceptual Pattern Matching

With the exemplary authentication mark authenticator, one may efficiently create and authenticate marked goods that thwart counterfeiting attempts. Furthermore, with the exemplary authentication mark authenticator, one may obtain traceability information using the marked goods. This tractability is beneficial to a forensics analysis.

Figure 5:
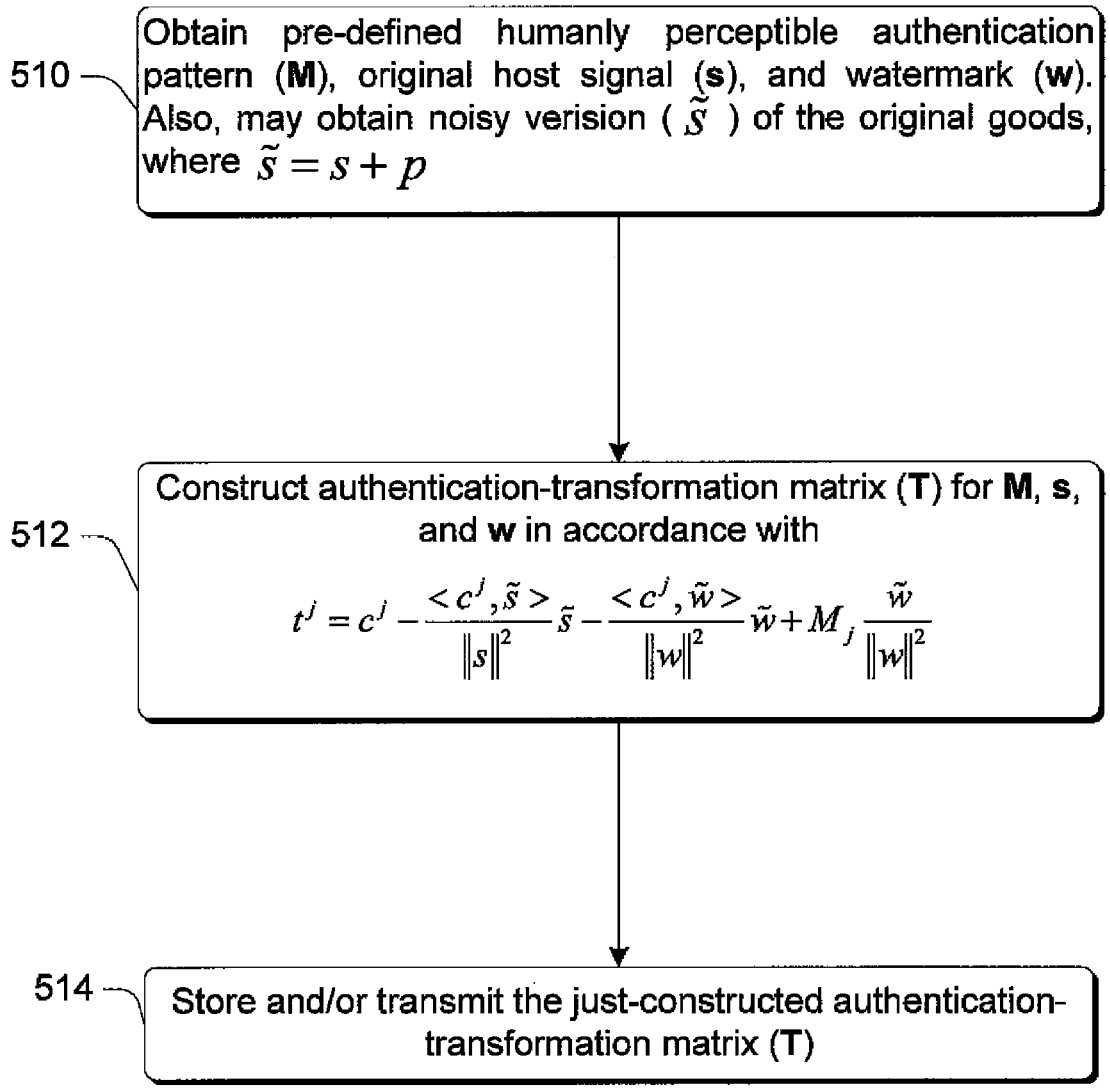
FIG. 5 is a flow diagram showing a methodological implementation described herein.
Figure 6:
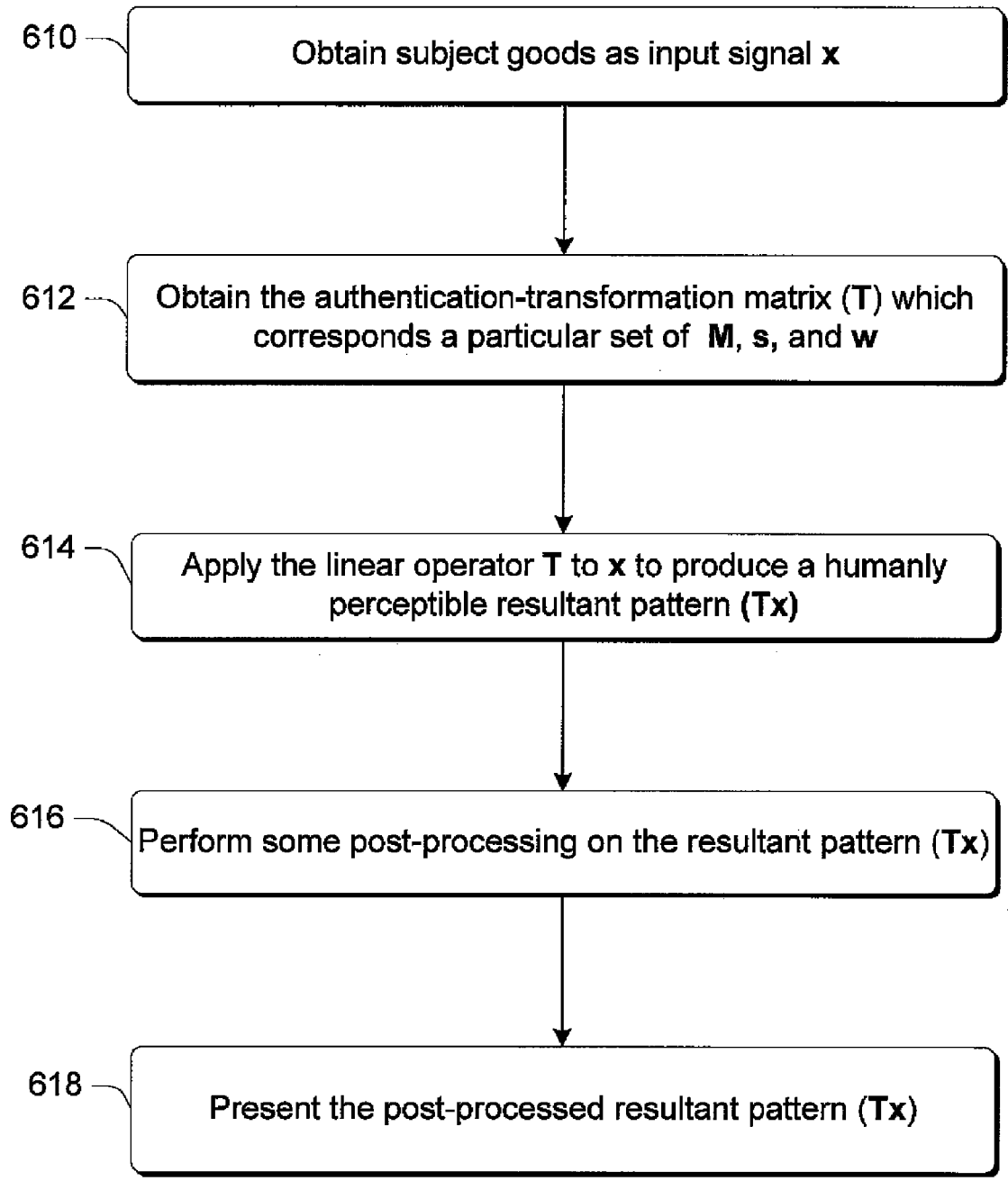
FIG. 6 is a flow diagram showing a methodological implementation described herein.
Figure 7A:
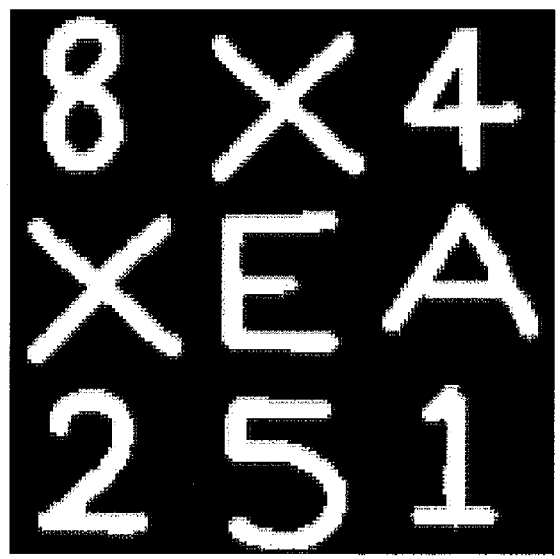
FIGS. 7A, 7B, and 7C are images that illustrate the output of an authenticator in accordance with an implementation.
Figure 7B:
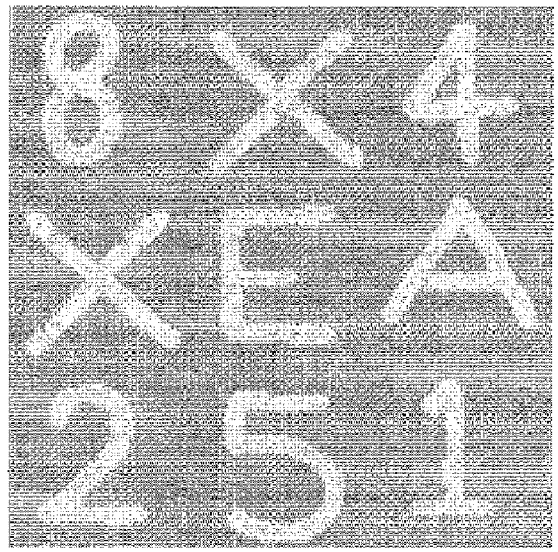
Figure 7C:
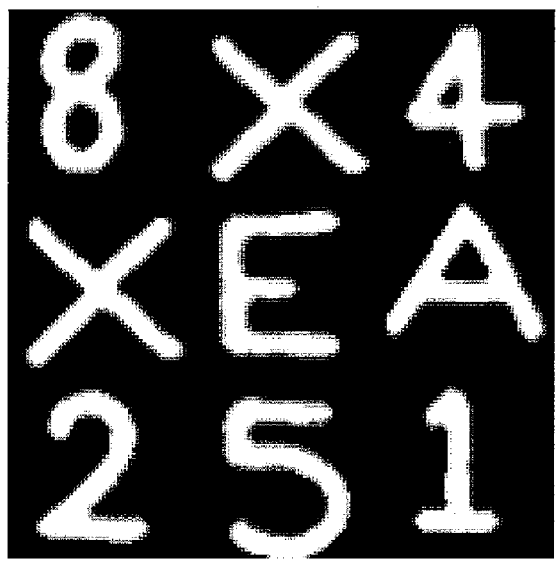

The operation of the exemplary authentication mark authenticator is discussed with regard to FIGS. 5 and 6 and images of FIGS. 7A, 7B, and 7C.

The implementation aspect may utilize the watermark embedding and detection of the exemplary deterministic watermarking (which is discussed herein with regard to FIGS. 3 and 4). However, that particular implementation of the exemplary deterministic watermarking is not necessary for all implementations of the exemplary authentication mark authenticator. Alternatively, the exemplary authentication mark authenticator may use any other suitable spread-spectrum watermarking scheme.

Within the exemplary authentication mark authenticator, an authentication transformation matrix is generated. It is based, at least in part, upon an authentication watermark and a pre-defined humanly perceptible authentication pattern (e.g., image, audio). For example, the image of FIG. 7A may represent a visual pre-defined authentication pattern.

With the exemplary authentication mark authenticator, subject goods are tested. This testing generates a humanly perceptible resultant pattern (e.g., image, audio) based, at least in part, upon the watermark detected in subject goods and the transformation matrix. For example, the image of FIG. 5B may represent a visual resultant pattern. If the detected watermark is the authentication watermark, then the resultant pattern and the pre-defined authentication pattern will match (or nearly so).

Unlike conventional watermark detection, the exemplary authentication mark authenticator produces a perceptual output. The image of FIG. 5B represents an example of visual output. However, such perceptual output may be other types, such as audio.

For contrast, in classical spread-spectrum schemes, detection is performed based on a single correlation output. Instead, the exemplary authentication mark authenticator produces a perceptual output for a human to verify and identify the otherwise hidden watermark.

While the types of subject goods are not limited, the discussion herein focuses on images for the explanatory and illustrative purposes. In particular, the image may have a digital manifestation when it is electronically stored or transmitted and it may have a physical manifestation when it is printed on a print medium.

Secret Key Distribution

With the exemplary secret key distribution, a secret key is hidden with the goods so that it may be read later by the detector/authenticator. This secret key is used by both the watermark embedder and detector/authenticator.

Figure 8:
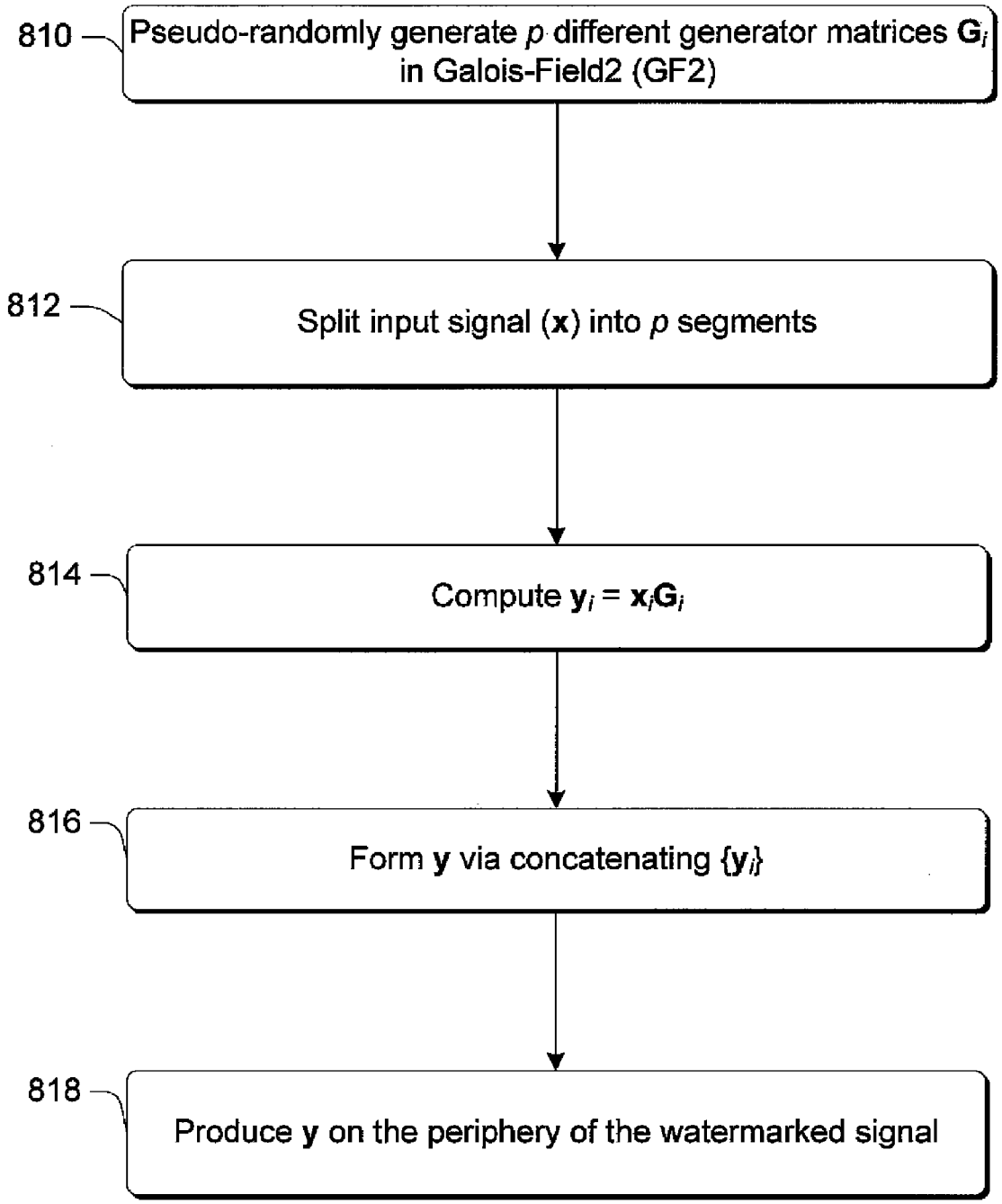
FIG. 8 is a flow diagram showing a methodological implementation described herein.
Figure 9:
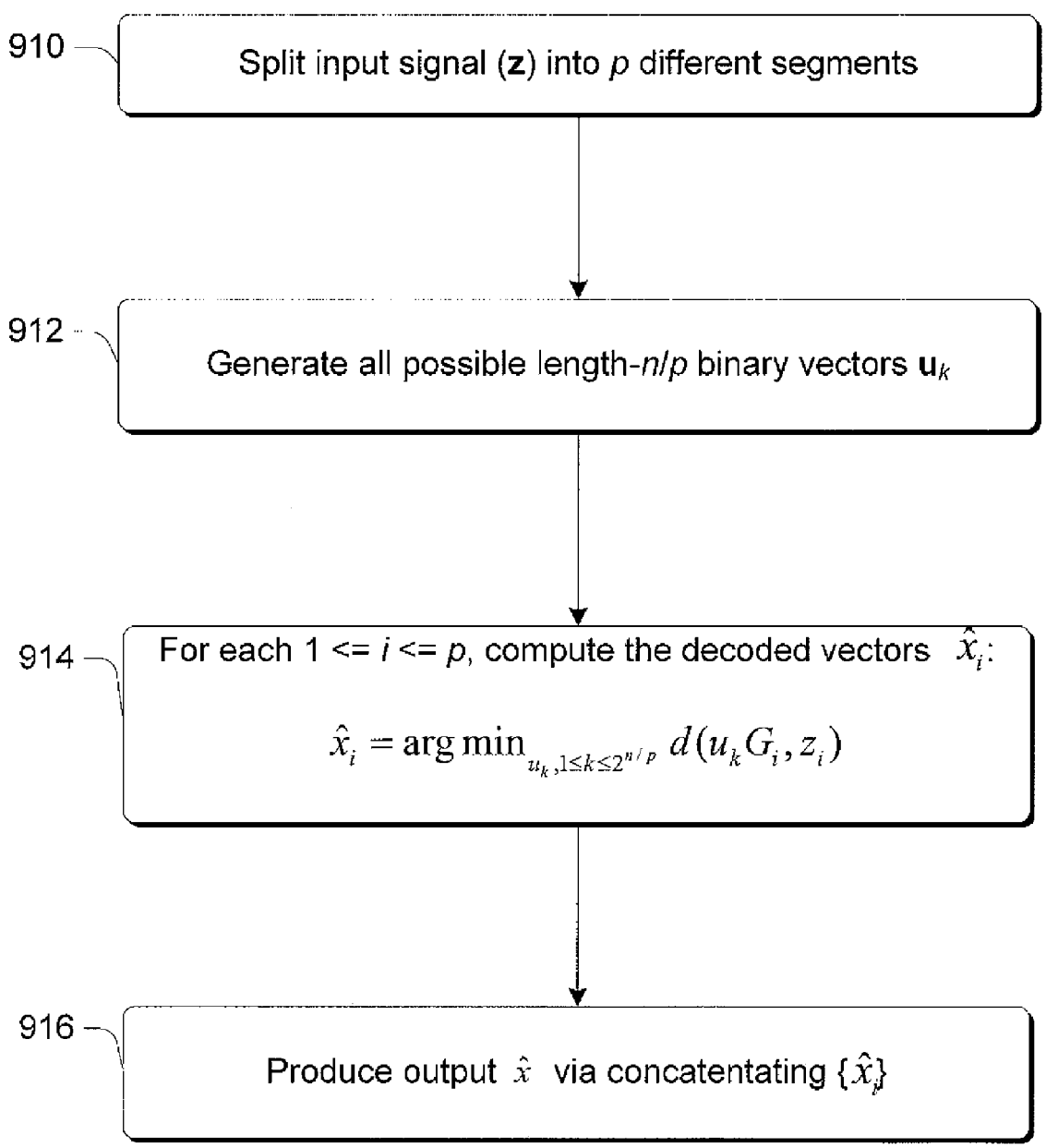
FIG. 9 is a flow diagram showing a methodological implementation described herein.
Figure 10A:
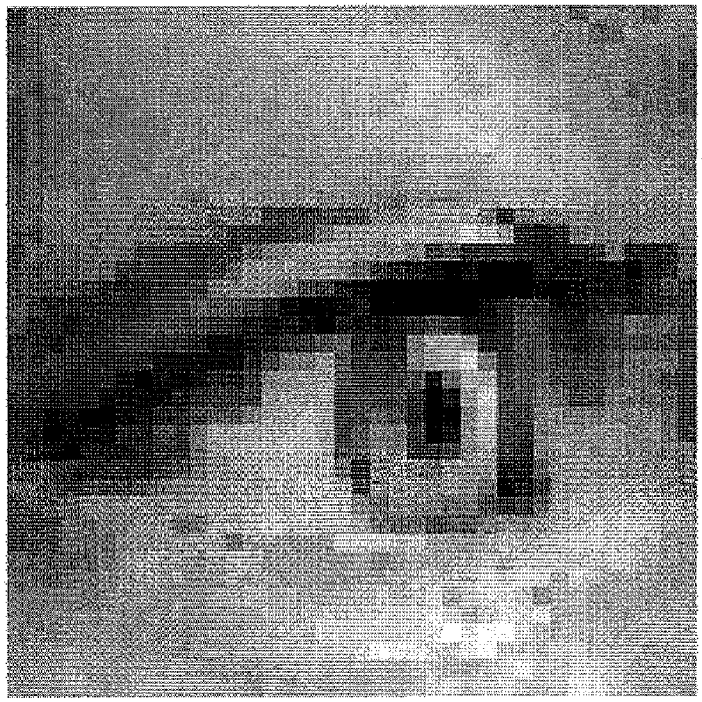
FIGS. 10A and 10B are an images used to illustrate the results produced in accordance with an implementation.
Figure 10B:
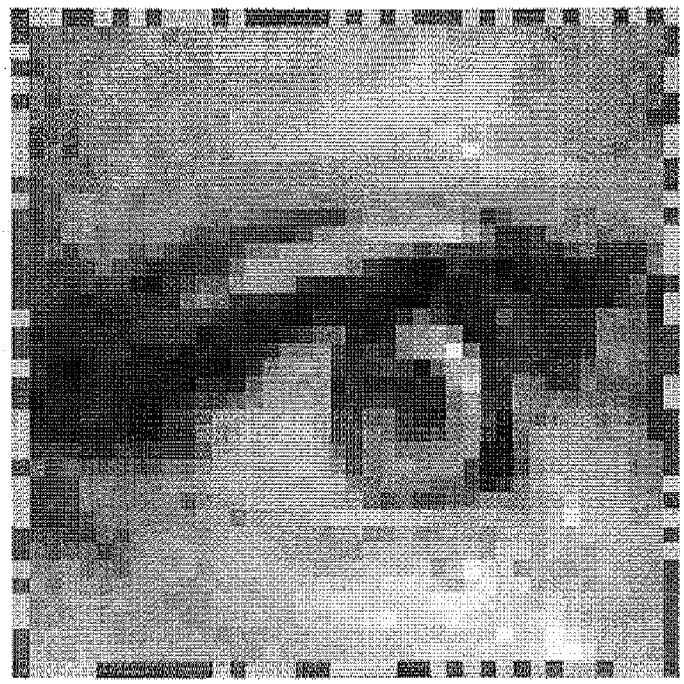

The operation of the exemplary secret key distribution is discussed with regard to FIGS. 8 and 9 and images of FIGS. 10A and 10B.

Authentication Watermark

In conventional watermarking, the presence of the watermark typically indicates some identifying information, such as copyright or ownership. An adversarial attacker wants to remove or impair the watermark while maintaining the goods in a reasonable good condition. If the attack is successful, the typical watermark detector does not detect or identify any watermark in the subject goods. Therefore, it must assume that the goods are in the public domain.

However, there are some instances where the identifying information of the goods is already known at the detection stage. Example of such instances include when the goods are legal tender, artwork, and certification marks.

In each of these instances, an "attacker" is more accurately described as a "forger" or "counterfeiter". Instead of wanting to remove the watermark, she wants to retain it and the goods in state as close to the original as possible. The forger wishes to pass-off her forged goods as genuine.

So, for the exemplary authentication architecture, it is assumed that the forger wishes to reproduce the marked goods as accurately as possible. The forger is likely to reproduce the marked goods by either copying the original marked goods or by manually generating a reproduction out-of-whole-cloth and inserting a legal-looking watermark therein.

The exemplary authentication architecture aims to be sufficiently robust enough against minor alterations such as noise addition, compression, smoothing, printing & scanning, and such. These alterations also include inevitable unintentional imperfections that occur in the field tests. But it does not need to be robust against outright and direct adversarial attacks designed to remove or impair the watermark. Without a watermark and the correct one at that, the subject goods are deemed to be counterfeit.

So, instead of detecting a presence of a watermark, the detector instead performs an authentication or certification of the subject goods. Herein, this is called watermark authentication or certification. Furthermore, the watermark being inserted is classified as an "authentication watermark" since it designed to help authenticate genuine goods, and thus fight counterfeiting of the goods.

Moreover, the embedded mark provides traceability information when detected properly and when it is used in combination with another generic tamper-evident system. In that case, such a generic tamper-evident system yields information about authenticity and our proposed system provides the origins of the leakage.

To that end, each entity having responsibility for issue genuine goods may have one or more watermarks (or other encoded keys) associated with them. Find a particular watermark associated with an issuer, effectively identifies the issuing entity. This identifying property of the mark (or other encoded keys) is analogous to being able to identify the mint the produces legal tender by an identifying mint mark.

Semi-Blind Watermarking

To detect a watermark, some watermarking techniques require access to the original unmarked good or to a pristine specimen of the marked good. Of course, these techniques are not desirable when the watermark authenticator is available publicly. If publicly available, then a malicious attacker may get access to the original unmarked good or to a pristine specimen of the marked good. Consequently, these types of techniques are not used for public authenticators.

Alternatively, many watermarking techniques are "blind." This means that they do not require access to the original unmarked good or to a pristine specimen of the marked good. Of course, these "blind" watermarking techniques are desirable when the watermark authenticator is publicly available.

The exemplary authentication architecture is semi-blind in the following sense: At the authentication side, it is assumed that there is some side information that is correlated with the original unmarked goods, but it does not require the presence of the original signal. As described herein, the exemplary authentication mark authenticator employs a noisy version of the unmarked goods without imposing any security threats. This still functions properly as far as mark authentication is concerned, but it is difficult for an adversary to obtain a good estimate of the original goods (assuming that the power of the disturbance in the noisy goods is sufficiently high).

Notation

This notion is used herein:

s: The data of the unmarked goods is viewed as a vector of size n×1 without loss of generality. Note that n is an input parameter in this description; however for the exemplary deterministic watermarking, n typically takes relatively small values (e.g., $\sqrt{n}<100$).

w: The watermark sequence of size n×1.

K: The secret key that shall be used as the seed of a secure pseudo-random number generator for the randomized portions of the embedding and authentication. K is assumed to be present both at the embedder and the authenticator. This key may be secretly encoded in the periphery of the goods. It controls the generation of w, T, and M.

M: This is a pre-defined humanly perceptible authentication pattern (e.g., image, audio). In at least one implementation, it is an image (such as FIG. 7A). Alternatively, it may be a audio pattern in an audio clip. It may have a signal of size m×1. Note that, in general, n≠m, and unlike n, exemplary authentication architecture controls the value of m. There is no restriction on this size due to physical limitations.

T: The authentication-transformation matrix. It is generated at the authenticator or at some intermediary between the embedder and authenticator. It is typically pseudo-randomly generated, but it is based, at least in part, upon the watermark (w) and the pre-defined pattern (M) and a possibly perturbed version of the unmarked signal s. In at least one implementation, its generation may be dependent on w, K, M, and a noisy version of s. The authentication-transformation matrix is of size m×n.

The combination of the detected watermark of the subject digital goods and the authentication-transformation matrix (T) produces a humanly perceptible resultant pattern (e.g., image, audio). If the detected watermark is the authentication watermark, then the resultant pattern and the pre-defined authentication pattern will match (or nearly so).

For illustration purposes and for ease of explanation, s is represented by image have a size of 40×40 (i.e., n=1600). Still for purposes of illustration and explanation, M represents an image of size 150×150, therefore m=22500. Those of ordinary skill in the art understand and appreciate that the relative sizes of s and M may vary for a desired implementation.

For convenience of this discussion, it is assumed that s, w, M, and T consist of real numbers. This description uses the usual $L^2$ inner product $<\bullet,\bullet>$ (which is defined as $<x,y>=\Sigma_i x_i y_i$ where x, y are real vectors and $x_i$, $y_i$ are the i-th components of x and y respectively) and the Euclidean norm $\|\bullet\|$ that is induced by it unless otherwise specified.

Exemplary Mark Embedding

FIG. 1 shows the mark embedding system 100. It includes a goods producer/provider 110 that produces and distributes original marked goods that includes content such as images, video, audio, etc. The goods producer/provider 110 may distribute the goods over a network 144 to a computing device or via processor-readable media 142, such as a CD-ROM. It may also generate a physical manifestation of the goods via a printer 152.

The goods producer/provider 110 has a content storage 120 to store digital goods of original content. The goods producer 110 has a watermark encoding system 130 to embed the digital goods with a watermark. The watermark encoding system 130 applies the watermark to digital goods (such as goods 122) from the content storage 120.

This watermark may be an authentication watermark and may identify the content as authentic or genuine. Furthermore, the watermark may be an entity identification watermark which may provide useful traceability information for forensics analysis. The watermark encoding system 130 may be implemented as a standalone process or incorporated into other applications or an operating system.

The goods producer/provider 110 has a goods distribution sub-system 140 that transmits the watermarked digital goods over the network 144 (e.g., the Internet). Alternatively, it stores the watermarked digital goods onto processor-readable media 142 (e.g., floppy disk or CD-ROM).

Alternatively, the goods producer/provider 110 has a goods production sub-system 150 and a printer 152 that prints the marked digital goods on print media. FIG. 1 shows an example of a physical manifestation 156 of marked goods being printed on a print medium 154 by the printer 152.

Exemplary Mark Authentication/Detection

FIG. 2 shows the exemplary authentication mark authenticator. It includes a computing device 210 which is typically equipped with one or more processors, a memory, one or more input devices, and one or more output devices (e.g., speakers, monitor, digital media writer, etc.). The one or more input devices is designed to receive input signals containing digital goods from one or more sources, such as sources illustrated in FIG. 2.

Examples of such sources includes a digital camera 230, a scanner 220, processor-readable media 242, and a network 244 (such as the Internet). Each source may contain or have access to digital goods. For example, the scanner 220 may produce a digital representation of goods 222 by scanning it.

The computing device 210 may be embodied in a many different ways, such as a computer, a handheld entertainment device, a set-top box, a television, an audio appliance, and so forth.

Deterministic Watermark Embedding

At the watermark encoding system 130, the exemplary deterministic watermarking obtains subject goods as an input signal. An input signal may also be called the host signal. The focus of the exemplary deterministic watermarking is to embed a watermark into a host signal having a relatively small size and do so in a matter that reduces the detectability of the embedded watermark by an adversary (when compared to conventional approaches).

The host signal may be viewed as a vector of size n×1 without loss of generality. For the exemplary deterministic watermarking, the host signal size has relatively small values of n (e.g., $\sqrt{n}<100$).

The exemplary deterministic watermarking generates a bandlimited (i.e., "smooth") pseudo-random signal and projects it onto a subspace that is orthogonal to the input signal. The outcome of the projection forms the watermark after further processing, such as integer rounding and quantization.

Given original unmarked goods, the exemplary deterministic watermarking fixes some s (i.e., data of original unmarked goods). In conventional spread-spectrum watermarking schemes, w (i.e., watermark) is generated pseudo-randomly and independently of the unmarked host signal s. Such conventional approaches rely on long signal lengths (i.e., large n) in order to ensure the convergence of <s, w> to 0. Such a convergence makes it more difficult for an adversary to detect and attack the embedded watermark.

The exemplary deterministic watermarking avoids this limitation by a deterministic construction of w that employs "Gramm-Schmidt orthogonalization." This operation projects w on the subspace orthogonal to s and is done so that to ensure the approximate equality of <s, w>~0 even when the size of s is small.

As known to those of ordinary skill in the art, the name "Gramm-Schmitt orthogonalization" is the standard name for this type of projection. As used herein, the primary example of projection is Gramm-Schmidt orthogonalization. Of course, the exemplary deterministic watermarking may employ other types of suitable projections that are current known or subsequently developed.

The projection is done so that it satisfies <s, w>=0 as follows:
  a pseudo-random vector a is generated;
  it is projected on a subspace that is orthogonal to s to get w;
  a scaling factor α may be applied to the outcome of the projection as well.

Let $P_x(\bullet)$ be the projection operator (whose domain is $R^n$) on the subspace that is spanned by $x \in R^n$:

$$P_x(y) = \frac{<x, y>}{\|x\|^2} x.$$

Similarly, let $P_x\perp(\bullet)$ be the projection operator (whose domain is $R^n$) on the subspace that is orthogonal to the subspace spanned by $x \in R^n$:

$$P_x\perp(y) = y - P_x(y).$$

Then, given a pseudo-random a, Gramm-Schmidt orthogonalization yields:

$$w = \alpha P_s \perp (\alpha), \tag{1.1}$$

which guarantees that w is pseudo-randomly generated and <w, s>=0.

Moreover, the exemplary deterministic watermarking generates w as a smoothly-varying vector such that it does not create perceptually annoying artifacts. Such high-frequency artifacts are dangerous in terms of security since they tend to increase the estimation accuracy of w for an adversary. This is because most of the energy of natural images is concentrated at low-frequencies. Furthermore, such artifacts could be annoying for the casual non-adversarial users as well.

The exemplary deterministic watermarking generates a smoothly-varying pseudo-random w that is orthogonal to s as follows:

Let $V_L \subseteq R^n$ be the subspace that consists of all bandlimited vectors in $R^n$ that are bandlimited to a given frequency $f_c$.

Let $n_L$ be the dimension of $V_L$ and $\{v_{Li}\}_{i=1}^{n_L}$ be a basis of $V_L$.

Similarly let $V_H \subseteq R^n$ be the complement of $V_L$ and let $n_H = n - n_L$ and $\{v_{Hi}\}_{i=1}^{n_H}$ be its dimension and a basis of it respectively.

Naturally, this means $\forall i,j, <v_{Li}, v_{Lj}> = <v_{Hi}, v_{Hj}> = \delta_{ij}$ and $<v_{Li}, v_{Hj}> = 0$, where $\delta_{ij}$ is the Kronecker-Delta function, i.e., $\delta_{ij}=1$ if $i=j$, $\delta_{ij}=0$ otherwise.

Herein, w is considered to be "smoothly-varying" if $\forall i, <w, v_{Hj}> = 0$. Thus, the exemplary deterministic watermarking pseudo-randomly generates w such that we have $\forall i, <w, s> = <w, v_{Hj}> = 0$.

Let $P_L(\cdot)$ and $P_H(\cdot)$ be the projection operators that project on $V_L$ and $V_H$ respectively (domains of both are $R^n$):

$$P_L(x) = \sum_{i=1}^{n_L} <x, v_{Li}> v_{Li},$$

$$P_H(x) = \sum_{i=1}^{n_H} <x, v_{Hi}> v_{Hi}.$$

Define $s_L = P_L(s)$ and $s_H = P_H(s)$. Now, given a pseudo-random a, the exemplary deterministic watermarking generates w as follows:

$$w = \alpha(a - P_{s_L}(a) - P_H(a)), \quad (1.2)$$

which guarantees that w is pseudo-randomly generated and $<w, s_L> = <w, v_{Hi}> = 0$. This trivially implies $<w, s> = 0$.

Generation of w via equation (1.2) ensures all the conditions mentioned above. The resulting w is in $R^n$. However, this may often not be desired due to some practical requirements.

In at least one implementation, the exemplary deterministic watermarking would like to have $w \in C = \{-C, -C+1, \ldots, C-1, C\}^n$, where C is some constant parameter. In this instance, it is desirable to have the elements of w be integers because s is typically a digital signal.

This may be achieved iteratively. Once a candidate w is identified, it is mapped onto C using a mapping and use the result in equation (1.2) in the place of a. The exemplary deterministic watermarking practically approximately almost always satisfies both equation (1.2) and the condition $w \in C$.

Methodology of the Exemplary Deterministic Mark Embedder

FIG. 3 shows a methodological implementation of the exemplary deterministic watermarking. This methodological implementation may be performed in software, hardware, or a combination thereof.

At 310 of FIG. 3, the exemplary deterministic watermarking obtains s and $\{v_{Li}\}$. Here $\{v_{Li}\}$ are the basis vectors that span the subspace $V_L$.

At 312, the exemplary deterministic watermarking computes $s_L = P_L(s)$. Here, $s_L$ is the projection of s on the subspace $V_L$ and $P_L$ is the corresponding projection operator.

At 314, it pseudo-randomly generates a, such that its elements are i.i.d. (independent identically distributed) random variables drawn from the uniform distribution in [−1, 1]. This typically employs a secure pseudo-random number generator (such as RC4) where the seed is set to the secret key K.

At 316, it sets $w_{prev} = a$, error=$10^{10}$, $\epsilon = 10^{-3}$.

At 318, while error>$\epsilon$, the exemplary deterministic watermarking repeats the following:

computes b via $b = w_{prev} - P_{sL}(w_{prev}) - P_H(w_{prev})$. Here, $w_{prev}$ is first projected on $V_H$ and the subspace spanned by $s_L$; then the outcomes of the projection are subtracted from $w_{prev}$ to obtain b. Equivalently, $w_{prev}$ is projected on the subspace orthogonal to s and then projected on $V_L$ and the outcome is b. Consequently, b is obtained, derived from $w_{prev}$ such that $<b, s> = 0$ and b is bandlimited (i.e., in $V_L$).

scales each element of b by C and then rounds to the nearest integer in [−C, C]. The result is $w_{next}$. Hence, b is mapped onto C and the result is $w_{next}$.

finds error=$\|w_{next} - w_{prev}\|$ Here the discrepancy between consecutive steps of the iterative algorithm is computed. The aim is for error to monotonically decrease with each iteration of the algorithm.

set $w_{prev} = w_{next}$.

At the end of this iterative block, $w_{next}$ satisfies to be orthogonal to s, bandlimited (i.e., in $V_L$) and an element of C (assuming convergence is achieved).

At 320, the watermarking vector is given by $w = w_{next}$ and the watermarked signal is given by s+w.

Typically, the iteration discussed above converges in less than ten iterations.

Exemplary Deterministic Mark Detection

FIG. 4 shows a methodological implementation of the exemplary deterministic watermarking. This methodological implementation may be performed in software, hardware, or a combination thereof.

At 410 of FIG. 4, the exemplary deterministic watermarking obtains an input x and the noisy version $\tilde{s}$ of the original signal. That would be $\tilde{s} = s + p$ (where p is previously generated at a secure location via equation (1.3), but it is not given to the detector).

At 412, it computes $\tilde{s}_L = P_L(\tilde{s})$.

At 414, the exemplary deterministic watermarking computes $\tilde{w}$ using the actions of blocks 314-318 of the methodological approach FIG. 3 and described above, where s and $s_L$ are replaced by $\tilde{s}$ and $\tilde{s}_L$ respectively.

It pseudo-randomly generates a such that its elements are i.i.d. (independent identically distributed) random variables drawn from the uniform distribution in [−1, 1]. This typically employs a secure pseudo-random number generator (such as RC4) where the seed is set to the secret key K. This secret key may be a watermark-specific secret key (as discussed below in section titled "Distribution of the Secret Key That Determines the Embedded Watermark").

It sets $\tilde{w}_{prev} = a$, error=$10^{10}$, $\epsilon = 10^{-3}$.

While error>$\epsilon$, the exemplary deterministic watermarking repeats the following:

computes b via $b = \tilde{w}_{prev} - P_{\tilde{s}_L}(\tilde{w}_{prev}) - P_H(\tilde{w}_{prev})$.

scales each element of b by C and then rounds to the nearest integer in [−C, C]. The result is $\tilde{w}_{next}$.

finds error=$\|\tilde{w}_{next} - \tilde{w}_{prev}\|$ set $\tilde{w}_{prev} = \tilde{w}_{next}$.

At 416, the perturbed watermark vector, that the detector will use for detection purposes, is given by $\tilde{w} = \tilde{w}_{next}$. Thus, the exemplary deterministic watermarking provides results of the watermark determination. Those results may be $\tilde{w}$.

Exemplary Authentication Mark Authentication

The exemplary authentication mark authenticator pseudo-randomly forms an "authentication matrix" whose rows are designed to be orthogonal to the unmarked goods, but possibly non-orthogonal to the watermark. The inner products of the rows of the authentication matrix and the watermark are known at the exemplary authentication mark authenticator. These inner products form the visual output based upon the subject goods. If the subject good is indeed watermarked, a visual representation of that watermark will be visible on a display.

The authentication is performed by applying the linear operator represented by the authentication matrix to the received signal and visually examining the output. If the visual output is "close" to a pre-determined figure or shape, the exemplary authentication mark authenticator declares that the watermark is present and not present otherwise. Therefore, the subject goods are determined to be authorized or not.

With at least one implementation, the exemplary authentication mark authenticator performs authentication using a variant of the correlation detector that has been modified to produce a visual output representation of such correlation. If s and K are both known at the authenticator, this task would be straightforward because w may be directly generated using s and K at the authenticator. However, for some applications, it is undesirable to give the unmarked source to the authenticator because it may be compromised.

Instead of having a pristine version of s available to the authenticator, at lease one implication employs a noisy version of s at the authenticator. More specifically, the authenticator is given $\tilde{s}=s+p$ where $<s, p>=0$ and $\forall i, <v_{Hj}, p>=0$. The generation of p is as follows:

$$p = q - P_{s_L}(q) - P_H(q), \quad (1.3)$$

where q is a randomly generated vector in $R^n$.

We assume that the authenticator is given $\|s_L\|, \|s\|,$ and $\|w\|$. Below is provided a brief intuitive discussion to clarify the effects of having $\tilde{s}$ instead of s at the authenticator. To simplify the discussion, the iterative portion of the embedding approach (discussed above) is not taken into account. In other words, this is assumed for the purposes of this discussion:

$$w = \alpha - P_{s_L}(\alpha) - P_H(\alpha), \quad (1.4)$$

Define $\tilde{s}_L = P_L(\tilde{s})$. Clearly, $\tilde{s}_L = s_L + p$ since $P_H(p) = 0$. The authenticator uses $\tilde{w}$, during authentication, where $$\tilde{w} = a - \frac{\|\tilde{s}_L\|^2}{\|s_L\|^2} P_{\tilde{s}_L}(a) - P_H(a). \quad (1.5)$$

It can be shown that $$\tilde{w} = w + \Delta w,$$

where w is given by equation (1.4) and $$\Delta w = -\frac{<a, s_L>}{\|s_L\|^2} p - \frac{<a, p>}{\|s_L\|^2} s_L - \frac{<a, p>}{\|s_L\|^2} p,$$

can be viewed as a "distortion" term in the generation of $\tilde{w}$ due to the presence of p.

Unlike any conventional watermark detection scheme, watermark authentication with the exemplary authentication mark authenticator is based on a human-perceptible output (e.g., an image or audio) that is produced by the authenticator. In conventional watermark schemes, the detector's output is typically a single number which is the correlation between the watermark and the received signal.

In order to obtain a visual output, the exemplary authentication mark authenticator produces a series of correlator outputs and shapes them, which can be easily recognized using the power of human perception. The digital good is increasingly more likely to be genuine the more closely the visual output at the authenticator is to the pre-defined humanly perceptible authentication pattern M when the watermark was present in the original marked goods.

In order to produce this human-perceptible output, the exemplary authentication mark authenticator applies a linear operator to the authenticator input signal. The linear operator is represented by the m×n matrix T.

Construction of Authentication-Transformation Matrix (T)

Construction of the authentication-transformation matrix (T) is not part of the watermark embedding process. An implementation of the exemplary authentication mark authenticator may be produced that utilizes any watermarked signal, where both the watermark and the pre-defined humanly perceptible authentication pattern (M) are known. The authentication-transformation matrix of a marked signal is initially generated before an attempted authentication of a corresponding subject signal.

The authentication-transformation matrix may be initially generated by any computing system that can include the mark embedding system 100.

Let $M_j$ be the j-th entry of M and $t^j$ be the j-th row of T, $1 \leq j \leq m$. The following construction is used to form T:

$$t^j = c^j - \frac{<c^j, \tilde{s}>}{\|s\|^2}\tilde{s} - \frac{<c^j, \tilde{w}>}{\|w\|^2}\tilde{w} + M_j \frac{\tilde{w}}{\|w\|^2}, \quad (1.6)$$

where $c^j$ is a pseudo-randomly generated 0-mean vector for the j-th row. For each j, $c^j$ is independently generated. It can be shown that $t^j$ can be rewritten as $$t^j = c^j - P_s(c^j) - P_w(c^j) + M_j \frac{w}{\|w\|^2} + \Delta t^j,$$

where $$\Delta t^j = -\frac{<c^j, s>}{\|s\|^2}p - \frac{<c^j, p>}{\|s\|^2}(s+p) - \\ \frac{<c^j, w>}{\|w\|^2}\Delta w - \frac{<c^j, \Delta w>}{\|w\|^2}(w + \Delta w) + M_j \frac{\Delta w}{\|w\|^2},$$

can be viewed as the "distortion" term in the generation of $t^j$ due to the presence of p.

It can be shown that $$<t^j, s> = <\Delta t^j, s>, \text{ and}$$

$$<t^j, w> = M_j + <\Delta t^j, s>.$$

Furthermore, $$\lim_{\|p\| \to 0} <t^j, s> = 0,$$

and $$\lim_{\|p\| \to 0} <t^j, w> = M_j.$$

Hence, $$\lim_{\|p\| \to 0} T(s+w) = M.$$

Similarly, it can be shown that, for fixed $\|p\|$, $T(s+w) \sim M$ for sufficiently large n.

Methodology of the Exemplary Authentication Mark Authenticator

FIGS. 5 and 6 show methodological implementations of the exemplary authentication mark authenticator. These methodological implementations may be performed in software, hardware, or a combination thereof.

Generation of the Authentication-Transformation Matrix (T)

FIG. 5 shows the generation of the authentication-transformation matrix (T). This methodological implementation may be performed (in whole or in part) by the mark embedding system 100, mark authentication system 200, and/or as part of a computing environment like that shown in FIG. 11.

At 510 of FIG. 5, the exemplary authentication mark authenticator obtains the pre-defined humanly perceptible authentication pattern (M), the original host signal (s), and the watermark (w). If a noisy version of the marked signal is used, then it may also obtain the noisy original host signal ($\tilde{s}$) and the noisy watermark ($\tilde{w}$).

At 512, the exemplary authentication mark authenticator constructs the authentication-transformation matrix (T). If the noisy original host signal ($\tilde{s}$) is being used, then T is constructed in accordance with equation (1.6). Otherwise, T is constructed in accordance with this equation:

$$t^j = c^j - \frac{<c^j, s>}{\|s\|^2} s - \frac{<c^j, w>}{\|w\|^2} w + M_j \frac{w}{\|w\|^2} \quad (1.7)$$

Alternatively, the users of an implementation of the exemplary authentication mark authenticator may prefer to have p=0 if they are convinced that the authentication is performed at a secure computer. This is equivalent to providing the unmarked signal s to the authenticator and having $\tilde{s}$=s.

At 514, the exemplary authentication mark authenticator stores and/or transmits the just-constructed authentication-transformation matrix (T).

Goods Authentication Based upon the Authentication-Transformation Matrix (T)

FIG. 6 shows the authentication of subject goods based upon the authentication-transformation matrix (T). This methodological implementation may be performed (in whole or in part) by the mark authentication system 200, and/or as part of a computing environment like that shown in FIG. 11.

At 610 of FIG. 6, the exemplary authentication mark authenticator obtains subject goods as input signal x.

At 612, the exemplary authentication mark authenticator obtains the authentication-transformation matrix (T) which corresponds a particular set of the pre-defined humanly perceptible authentication pattern (M), the original host signal (s), and the watermark (w). It may have T in storage and/or receive it via a transmission. Alternatively, it may re-constructing T in accordance with equation (1.6).

At 614, the exemplary authentication mark authenticator applies the linear operator T to x to produce a human-perceptible output defined by Tx. This is the humanly perceptible resultant pattern (e.g., image, audio).

At 616, it performs some post-processing to clean up the resultant pattern and enhance its human-perceptibility characteristics. For example, if the pattern is an image, then any well-known image-enhancing image-processing techniques may the applied enhance any discernable pattern in the image.

At 618, it presents post-processed resultant pattern (Tx).

A human who perceives the output will make a decision whether the watermark is present based upon whether the resultant pattern is sufficiently similar to M; not present otherwise. In other words, the human makes a determination whether the human-perceptible output defined by Tx is sufficiently similar to the pre-defined pattern M. If it is, then this may also be useful in identifying the source of the watermarked subject goods.

Alternatively, the authentication determination may be partially or fully automated. If it is partially automated, the authenticator may flag questionable goods for the human to make a final authentication decision. If it is fully automated, then image processing techniques (along with others) may be used to make an authentication decision.

However, the implementation, described above, relies on the human visual perception to make the final authentication. That is because the human visual system performs better at detection of shapes than computerized algorithms in general. Furthermore, similar modifications on the input goods would result in clustered modifications on the human-perceptible authenticator output.

Thus, human testers would be likely to improve their performances in time using their "experiences" based on prior human-perceptible detector outputs they observed. Hence, if the human-perceptible authenticator output is close to M, but with some significant degradation, it will be the judgment of those testers, who have developed their skills in time, that will determine the result.

Since the output is intended to be a meaningful image M (in the case of the presence of a watermark), standard image processing techniques may be applied to the authenticator's output to further enhance "human-perceptible detectibility." Such techniques may include regularization, smoothing, denoising, etc. For instance, experiments have shown that median filtering followed by thresholding significantly improves the human-perceptible authenticator outputs.

Furthermore, certain consistent defects at the authenticator output would possibly be useful in a scenario where the exemplary authentication mark authenticator is used for forensics analysis, attack classification, etc.

Output from the Authenticator

FIG. 7A illustrates an example of a pre-defined pattern M that is expected to be produced if the marked goods (with watermark therein) remain pristine.

FIG. 7B illustrates an example of the output from the authenticator, which is Tx. FIG. 7C represents the same image after some image processing transformations are performed to enhance the contrasting pattern therein. Although fuzzy at points, the output from the authenticator (represented by FIGS. 7B, and 7C) clearly matches the pre-chosen pattern M shown in FIG. 7A. Therefore, it is likely that the subject goods being tested by the authenticator may be declared to have the embedded watermark inside.

While the examples here show a visual pre-defined pattern M for subject goods are images, other combinations are possible. For example, a visual pre-defined pattern M may be employed with other goods, such as audio, video, software, authentication modules, databases, and other sets of data or information. Also, the pre-defined pattern M may be an audio clip, multimedia stream, data entry data (e.g., a password), an executable program module, etc.

Imagine these example scenarios below. They all assume that the result of the authentication is that the subject goods are genuine. If the goods are not genuine, then the opposite occurs:

Authentication of a music clip produces a resultant audio pattern (Tx) that plays an identifying audio (e.g., "This is an authorized copy of Song Title by PublisherName.").

Authentication of a licensed image produces a visual resultant image (Tx) that will reveals a licensing identification number (LIN) that identifies the publisher/licensee of the image. Therefore, the image is known to be genuine and identity of the publisher/licensee is known.

Authentication of software produces a visual resultant image (Tx) that will reveals an authentication code for software.

Authentication of a music clip produces a visual resultant image (Tx) that will reveals publisher information.

Authentication of a multimedia stream produces an audio pattern (Tx) that plays an identifying audio (e.g., "This is an authorized copy of MovieTitle by StudioName.").

Authentication of software produces a resultant program module (Tx) that executes on the computer to perform some sort of authentication action that authorizes use of software.

Distribution of the Secret Key That Determines the Embedded Watermark

As mentioned above, the secret key (K) is used as the seed of a secure pseudo-random number generator for the randomized portions of both the embedding and authentication (or detection). K is assumed to be known or determinable at both the embedder and the authenticator. As the seed for pseudo-random number generation, the secret key (K) controls the generation of w, T, and M.

It is a security risk to have only one secret key and that key's being available at the authenticator. The authenticator may fall into the hands of an unscrupulous individual who may attempt to extract the secret key. Once cracked, the attacker may act with impunity. Furthermore, changing secret codes may be desirable, but impractical or difficult. Not all authenticators may be updated in a timely manner.

One conventional technique to overcome this problem is for the embedder to use one of multiple (perhaps thousands or millions) secret keys. Then the authenticator attempts to do an authentication on all of this possible keys until it finds one that discovers an embedded watermark. However, this may be computationally inefficient since it may require minutes or even hours of processing to make a determination.

Instead of using the conventional approaches, the exemplary authentication architecture employs secret key distribution. With it, the secret key is hidden with the goods so that it may be read later by the authenticator. The exemplary authentication architecture may be implemented so that every issuing entity corresponds to one or more different secret watermarks and one or more secret keys. Similarly, it may be implemented so that each different embedded watermark corresponds to one or more different secret key.

The one or more exemplary implementations, described herein, of the secret key distribution may be implemented (in whole or in part) by authentication architecture, mark embedding system 100, mark authentication system 200, and/or as part of a computing environment like that shown in FIG. 11.

In at least one example implementation that includes image watermarking on printed media, the exemplary secret key distribution secretly encodes the secret key into and/or around the physical manifestation of the marked goods. For example, the exemplary secret key distribution may clandestinely encode a version of the secret key around the watermarked image in the form of a border that consists of "light" and "dark" pixels.

Alternatively, an audio clip may be watermarked so that the secret key is clandestinely encoded in the "noise" preceding and/or following the clip in the time domain and/or outside the human hearing range in the frequency domain.

In order to achieve this purpose, the exemplary secret key distribution uses pseudo-randomly generated error-correction code for encoding purposes. A master key is used to generate such an error-correction code. The exemplary secret key distribution uses a secret error-correction code instead of conventional encryption schemes in order to further correct possible errors that may happen during the printing and scanning process.

For the purposes of this discussion, let x be a binary user id of length n, i.e., $x \in \{0,1\}^n$. Let m be the size of the binary border that we shall use, m>n. The exemplary secret key distribution uses a pseudo-randomly generated error-correction code to encodes x to $y \in \{0,1\}^m$. The master key K shall be used as the seed of the random number generator in the generation of the code. The master key K is different from the user-specific secret key and it is known at all of the authenticators. The master key K should remain as a secret and not be revealed to any unauthorized party.

Although the description below is confined to linear block codes, the general idea may be used with other pseudo-randomly generated non-algebraic codes as well. Let p be an integer that divides both n and m.

Methodology of Encoding the Secret Key

FIG. 8 shows a methodological implementation of encoder of the exemplary secret key distribution. This methodological implementation may be performed in software, hardware, or a combination thereof.

At 810, the encoder pseudo-randomly generates p different generator matrices $G_i$ in Galois-Field2 (GF2), $1 \leq i \leq p$. Note that each $G_i$ is of size $(n/p) \times (m/p)$ and it should be full-rank.

One way to achieve full-rank generator matrix construction in GF2 is to generate each $G_i$ in its systematic form. That is $G_i = [I_{(n/p) \times (n/p)} | R_{(n/p) \times (m/p - n/p)}]$, where $I_{(n/p) \times (n/p)}$ is the identity matrix of size $(n/p) \times (n/p)$ and $R_{(n/p) \times (m/p - n/p)}$ is a pseudo-random matrix of size $(n/p) \times (m/p - n/p)$. In other words, each entry of R is 0 or 1 with probability ½. This construction guarantees that $G_i$ is full-rank (rank (n/p)) and furthermore each full-rank matrix can be reduced to such systematic form.

At 812, the encoder splits x into p segments, where segment i is given by $x_i = [x_{(i-1)*(n/p)+1}, \ldots, x_{i*p}]$, $1 \leq i \leq p$, where $x_j$ is the j-th element of x, $1 \leq j \leq n$.

At 814, the encoder computes $y_i = x_i G_i$, $1 \leq i \leq p$. Note that $\forall i, y_i \in \{0,1\}^{m/p}$.

At 816, the encoder forms y via concatenating $\{y_i\}$: $y_{(i-1)*(m/p)+j} = y_{ij}$, $1 \leq i \leq p$, $1 \leq j \leq (m/p)$, where $y_k$ and $y_{ij}$ are k-th and l-th elements of y and $y_i$ respectively.

At 818, it produces y on the periphery of the watermarked signal. In the case of a printed image, it prints y surrounding the watermarked image in the form a border that consists of "light" and "dark" pixels, where "light" (resp. "dark") corresponds to a 0 (resp. 1). In the case of audio, it may encode y in the "noise" outside the range of human hearing in the frequency domain or before/after the beginning/end of the clip in the time domain.

Methodology of Decoding the Secret Key

FIG. 9 shows a methodological implementation of the decoder of the exemplary secret key distribution. This methodological implementation may be performed in software, hardware, or a combination thereof.

Let $z \in \{0,1\}^m$ be the input of the decoder. The input z could be obtained, for example, by scanning a printed image, such as what is illustrated in FIG. 2. Furthermore, it is assumed that the secret master key K and the constants m, n, p are known at the decoder. The goal here is to find out the secret key that determines the embedded watermark.

At 910, the decoder splits z into p different segments $z_i$, $1 \leq i \leq p$, each length m/p: $z_i = [z_{(i-1)*(m/p)+1}, \ldots, z_{i*p}]$, where $z_j$ is the j-th element of z, $1 \leq j \leq m$.

At 912, the decoder generates all possible length-n/p binary vectors $u_k$, $1 \leq k \leq 2^{n/p}$.

At 914, for each $1 \leq i \leq p$, the decoder computes the decoded vectors $\hat{x}_i$: $\hat{x}_i = \arg\min_{H_k, 1 \leq k \leq 2^{n/p}} d(u_k G_i, z_i)$.

At 916, the decoder produces output $\hat{x}$, which is given via concatenating $\{\hat{x}_i\}$: $\hat{x}_{(i-1)*(n/p)+j} = \hat{x}_{i,j}$, $1 \leq i \leq p$, $1 \leq j \leq (n/p)$, where $\hat{x}_k$ and $\hat{x}_{i,l}$ are k-th and l-th elements of $\hat{x}$ and $\hat{x}_i$ respectively.

Secret Key Distribution

FIG. 10A shows an example of an marked image without the boundary information carrying the secret key. FIG. 10B shows an example of the same marked image, but it now includes the boundary information carrying the watermark-specific secret key.

One way to measure security of this secret key distribution is to quantify the entropy that is introduced by it. The entropy in the formation of each $$G_i \text{ is } \frac{n}{p} \Box \frac{m-n}{p}$$

bits. Therefore, the total entropy of this secret key distribution is $$\frac{n(m-n)}{p}$$

bits. Hence, for fixed m, n, the security of our scheme decreases in p with the rate of 1/p.

In this implementation described above, the encoding time is polynomial since a linear block code is used. However, the decoding time is exponential since the code has no structure (since it is randomly chosen). For each $1 \leq i \leq p$, and for each given $u_k$, computing $$u_k G_i \text{ costs } \frac{mn^2}{p^3} \text{ GF2}$$

multiplications and $$\frac{mn}{p^2} \text{ GF2}$$

additions, hence a total of $$\frac{mn(n+p)}{p^3} \text{ GF2}$$

operations. This is repeated for each $1 \leq i \leq p$ and each $1 \leq k \leq 2^{n/p}$. Hence, the total computational cost is $$2^{n/p} \frac{mn(n+p)}{p^2} \text{ GF2}$$

operations, which is dominated by $2^{n/p}$.

Exemplary Computing System and Environment

FIG. 11 illustrates another example of a suitable computing environment 1100 within which one or more implementations, as described herein, may be implemented (either fully or partially). The computing environment 1100 may be utilized in the computer and network architectures described herein.

The exemplary computing environment 1100 is only one example of a computing environment and is not intended to suggest any limitation as to the scope of use or functionality of the computer and network architectures. Neither should the computing environment 1100 be interpreted as having any dependency or requirement relating to any one or combination of components illustrated in the exemplary computing environment 1100.

The one or more embodiments, as described herein, may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The one or more implementations, as described herein, may be described in the general context of processor-executable instructions, such as program modules, being executed by a processor. Generally, program modules include routines, programs, objects, components, data structures, etc. that perform particular tasks or implement particular abstract data types.

The one or more implementations, as described herein, may also be practiced in distributed computing environments where tasks are performed by remote processing devices that are linked through a communications network. In a distributed computing environment, program modules may be located in both local and remote computer storage media including memory storage devices.

The computing environment 1100 includes a general-purpose computing device in the form of a computer 1102. The components of computer 1102 may include, but are not limited to, one or more processors or processing units 1104, a system memory 1106, and a system bus 1108 that couples various system components, including the processor 1104, to the system memory 1106.

The system bus 1108 represents one or more of any of several types of bus structures, including a memory bus or memory controller, a peripheral bus, an accelerated graphics port, and a processor or local bus using any of a variety of bus architectures. By way of example, such architectures can include a CardBus, Personal Computer Memory Card International Association (PCMCIA), Accelerated Graphics Port (AGP), Small Computer System Interface (SCSI), Universal Serial Bus (JSB), IEEE 1394, a Video Electronics Standards Association (VESA) local bus, and a Peripheral Component Interconnects (PCI) bus also known as a Mezzanine bus.

Computer 1102 typically includes a variety of processor-readable media. Such media may be any available media that is accessible by computer 1102 and includes both volatile and non-volatile media, removable and non-removable media.

The system memory 1106 includes processor-readable media in the form of volatile memory, such as random access memory (RAM) 1110, and/or non-volatile memory such as read only memory (ROM) 1112. A basic input/output system (BIOS) 1114, containing the basic routines that help to transfer information between elements within computer 1102, such as during start-up, is stored in ROM 1112. RAM 1110 typically contains data and/or program modules that are immediately accessible to and/or presently operated on by the processing unit 1104.

Computer 1102 may also include other removable/non-removable, volatile/non-volatile computer storage media. By way of example, FIG. 11 illustrates a hard disk drive 1116 for reading from and writing to a non-removable, non-volatile magnetic media (not shown), a magnetic disk drive 1118 for reading from and writing to a removable, non-volatile magnetic disk 1120 (e.g., a "floppy disk"), and an optical disk drive 1122 for reading from and/or writing to a removable, non-volatile optical disk 1124 such as a CD-ROM, DVD-ROM, or other optical media. The hard disk drive 1116, magnetic disk drive 1118, and optical disk drive 1122 are each connected to the system bus 1108 by one or more data media interfaces 1126. Alternatively, the hard disk drive 1116, magnetic disk drive 1118, and optical disk drive 1122 may be connected to the system bus 1108 by one or more interfaces (not shown).

The disk drives and their associated processor-readable media provide non-volatile storage of processor-readable instructions, data structures, program modules, and other data for computer 1102. Although the example illustrates a hard disk 1116, a removable magnetic disk 1120, and a removable optical disk 1124, it is to be appreciated that other types of processor-readable media, which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 1116, magnetic disk 1120, optical disk 1124, ROM 1112, and/or RAM 1110, including by way of example, an operating system 1126, one or more application programs 1128, other program modules 1130, and program data 1132.

A user may enter commands and information into computer 1102 via input devices such as a keyboard 1134 and a pointing device 1136 (e.g., a "mouse"). Other input devices 1138 (not shown specifically) may include a microphone, joystick, game pad, satellite dish, serial port, scanner, and/or the like. These and other input devices are connected to the processing unit 1104 via input/output interfaces 1140 that are coupled to the system bus 1108, but may be connected by other interface and bus structures, such as a parallel port, game port, or a universal serial bus (USB).

A monitor 1142 or other type of display device may also be connected to the system bus 1108 via an interface, such as a video adapter 1144. In addition to the monitor 1142, other output peripheral devices may include components, such as speakers (not shown) and a printer 1146, which may be connected to computer 1102 via the input/output interfaces 1140.

Computer 1102 may operate in a networked environment using logical connections to one or more remote computers, such as a remote computing device 1148. By way of example, the remote computing device 1148 may be a personal computer, portable computer, a server, a router, a network computer, a peer device or other common network node, and the like. The remote computing device 1148 is illustrated as a portable computer that may include many or all of the elements and features described herein, relative to computer 1102.

Logical connections between computer 1102 and the remote computer 1148 are depicted as a local area network (LAN) 1150 and a general wide area network (WAN) 1152. Such networking environments are commonplace in offices, enterprise-wide computer networks, intranets, and the Internet.

When implemented in a LAN networking environment, the computer 1102 is connected to a local network 1150 via a network interface or adapter 1154. When implemented in a WAN networking environment, the computer 1102 typically includes a modem 1156 or other means for establishing communications over the wide network 1152. The modem 1156, which may be internal or external to computer 1102, may be connected to the system bus 1108 via the input/output interfaces 1140 or other appropriate mechanisms. It is to be appreciated that the illustrated network connections are exemplary and that other means of establishing communication link(s) between the computers 1102 and 1148 may be employed.

In a networked environment, such as that illustrated with computing environment 1100, program modules depicted relative to the computer 1102, or portions thereof, may be stored in a remote memory storage device. By way of example, remote application programs 1158 reside on a memory device of remote computer 1148. For purposes of illustration, application programs and other executable program components, such as the operating system, are illustrated herein as discrete blocks, although it is recognized that such programs and components reside at various times in different storage components of the computing device 1102, and are executed by the data processor(s) of the computer.

Processor-Executable Instructions

One or more implementations, as described herein, may be described in the general context of processor-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Processor-Readable Media

One or more implementations, as described herein, may be stored on or transmitted across some form of processor-readable media. Processor-readable media may be any available media that may be accessed by a computer. By way of example, and not limitation, processor-readable media may comprise "computer storage media" and "communications media."

"Computer storage media" include volatile and non-volatile, removable and non-removable media implemented in any method or technology for storage of information such as processor-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies processor-readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of processor-readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-storage device storing processor-executable instructions thereon that, when executed by a processor, directs the processor to perform a method comprising:
   obtaining original unmarked goods;
   deterministically constructing a watermark based upon a projection directly from the original unmarked goods.

2. A device as recited in claim 1, wherein the original unmarked goods are small.

3. A device as recited in claim 1 further comprising generating the projection of the original unmarked goods, wherein the projection is orthogonal in a defined subspace to the original unmarked goods.

4. A computer-storage device storing processor-executable instructions thereon that, when executed by a processor, directs the processor to perform a method comprising:
   obtaining original unmarked goods, wherein original unmarked goods is defined as a vector of size n×1 and the goods have a value n below $\sqrt{n}<100$;
   deterministically constructing a watermark based upon a projection from the original unmarked goods.

5. A computer-storage device storing processor-executable instructions thereon that, when executed by a processor, directs the processor to perform a method comprising:
   obtaining original unmarked goods;
   deterministically constructing a watermark based upon a projection from the original unmarked goods;
   generating a bandlimited pseudo-random signal and projecting the signal onto a subspace that is orthogonal to the original unmarked goods, wherein the projected signal is the projection from the goods.

6. A method comprising:
   obtaining original unmarked goods;
   deterministically constructing a watermark based upon a projection directly from the original unmarked goods.

7. A method as recited in claim 6, wherein original unmarked goods are small.

8. A method as recited in claim 6 further comprising generating the projection of the original unmarked goods, wherein the projection is orthogonal in a defined subspace to the original unmarked goods.

9. A method 6 comprising:
   obtaining original unmarked goods, wherein original unmarked goods is defined as a vector of size n×1 and the goods have a value n below $\sqrt{n}<100$;
   deterministically constructing a watermark based upon a projection from the original unmarked goods.

10. A method comprising:
    obtaining original unmarked goods;
    deterministically constructing a watermark based upon a projection from the original unmarked goods;
    generating a bandlimited pseudo-random signal and projecting the signal onto a subspace that is orthogonal to the original unmarked goods, wherein the projected signal comprises the projection from the goods.

* * * * *

UNITED STATES PATENT AND TRADEMARK OFFICE
CERTIFICATE OF CORRECTION

| | | |
|---|---|---|
| PATENT NO. | : 7,844,073 B2 | Page 1 of 1 |
| APPLICATION NO. | : 11/850414 | |
| DATED | : November 30, 2010 | |
| INVENTOR(S) | : Mustafa Kesal et al. | |

It is certified that error appears in the above-identified patent and that said Letters Patent is hereby corrected as shown below:

On the Title Page, Item 75,
change "Redwood," to -- Redmond, --.

Signed and Sealed this
Twenty-second Day of February, 2011

David J. Kappos
*Director of the United States Patent and Trademark Office*